US012700694B2

(12) United States Patent
Kawanishi

(10) Patent No.: US 12,700,694 B2
(45) Date of Patent: Aug. 4, 2026

(54) CONNECTOR MODULE

(71) Applicant: HOSIDEN CORPORATION, Osaka (JP)

(72) Inventor: Takahide Kawanishi, Osaka (JP)

(73) Assignee: Hosiden Corporation, Osaka (JP)

( * ) Notice: Subject to any disclaimer, the term of this patent is extended or adjusted under 35 U.S.C. 154(b) by 317 days.

(21) Appl. No.: 18/373,402

(22) Filed: Sep. 27, 2023

(65) Prior Publication Data

US 2024/0106154 A1 Mar. 28, 2024

(30) Foreign Application Priority Data

Sep. 27, 2022 (JP) ................................ 2022-153923

(51) Int. Cl.

*H01R 13/504* (2006.01)
*H01R 9/05* (2006.01)
*H01R 13/405* (2006.01)
*H01R 13/50* (2006.01)
*H01R 24/76* (2011.01)

(52) U.S. Cl.

CPC ........... *H01R 13/5045* (2013.01); *H01R 9/05* (2013.01); *H01R 13/405* (2013.01); *H01R 13/50* (2013.01); *H01R 24/76* (2013.01)

(58) Field of Classification Search

CPC .... H01R 13/5045; H01R 9/05; H01R 13/405; H01R 13/50; H01R 24/76; H01R 12/7076; H01R 13/6594; H01R 24/542; H01R 2103/00; H01R 24/50; H04N 23/57

See application file for complete search history.

(56) References Cited

U.S. PATENT DOCUMENTS

| | | | | |
|---|---|---|---|---|
| 2018/0164528 A1 | 6/2018 | Sakamoto | | |
| 2018/0183162 A1 | 6/2018 | Sakamoto | | |
| 2021/0313746 A1* | 10/2021 | Kato | .................. | H01R 13/6215 |
| 2022/0368051 A1 | 11/2022 | Asano et al. | | |

FOREIGN PATENT DOCUMENTS

| | | | | |
|---|---|---|---|---|
| CN | 109524826 A * | 3/2019 | ............. | H01R 13/46 |
| JP | 2018-98069 A | 6/2018 | | |
| JP | 2018-107097 A | 7/2018 | | |
| JP | 2019-53943 A | 4/2019 | | |
| JP | 2021-166161 A | 10/2021 | | |
| WO | 2021/095485 | 5/2021 | | |

OTHER PUBLICATIONS

Search Report issued Jan. 23, 2024 in European appln. No. 23197397.8.

* cited by examiner

*Primary Examiner* — Joseph Ortega
(74) *Attorney, Agent, or Firm* — Dilworth & Barrese, LLP

(57) ABSTRACT

A connector module includes: a connector unit; and a case holding the connector unit. The connector unit includes: a shaft-shaped terminal made of an electrically conductive material; a cylindrical shell made of an electrically conductive material; and a holder made of an electrically insulative resin material and disposed around the shaft-shaped terminal. The case is made of an electrically conductive material and includes a wall with an insertion hole, and holding the connector unit through the insertion hole. The shell includes a plurality of radially outward protrusions at an outer surface. The protrusions are press-fitted through the insertion hole and in contact with the inner surface of the wall for electric connection between the shell to the case.

8 Claims, 5 Drawing Sheets

CONNECTOR MODULE

CROSS REFERENCE TO RELATED APPLICATION

This application is based on and claims priority under 35 U.S.C. Section 119 to Japanese Patent Application No. 2022-153923 filed on Sep. 27, 2022, the entire content of which are incorporated herein by reference.

TECHNICAL FIELD

This disclosure relates to a connector module.

BACKGROUND ART

JP2021-166161A discloses a connector module configured to connect a coaxial cable with a camera module. The connector module includes a connector case, a housing, and a terminal module. The connector case is made of an electrically insulative material such as resin, and has an insertion hole. The housing is made of an electrically insulative material such as resin, has a cylindrical space, and is fitted through the insertion hole. The terminal module is in the cylindrical space of the housing.

The terminal module includes an electrically conductive center conductor, an electrically conductive cylindrical shell outward of the center conductor, and a holder made of an electrically insulative material and disposed between the two conductors. The coaxial cable is provided with a coaxial connector having a jack, and includes an inner conductor and an outer conductor. The terminal module is configured to be connected with the coaxial cable in response to, for example, insertion of the jack, causing the center conductor and the cylindrical shell to be electrically conductive to the inner and outer conductors, respectively.

The connector module includes a shield case at an inner peripheral portion of the connector case. The shield case is electrically conductive to the cylindrical shell.

JP2018-107097A discloses a connector case ("case section" in the document) die-casted from an aluminum alloy and integrally including a cylindrical fitting section protruding outward. The fitting section has an internal space and includes a partition wall inside. To place a terminal module ("external connector" in the document) in the internal space, the fitting section has a space through which the terminal module is inserted through the partition wall.

The partition wall has a depression at its inner circumference. The terminal module has a portion on the base-end side which portion includes a fitting protrusion at its outer circumference which fitting protrusion is configured to be fitted in the depression. Fitting the fitting protrusion into the depression allows the external connector to be held by the case section.

Similarly to JP2018-107097A, JP2018-98069A discloses a connector case ("case section" in the document) die-casted from an aluminum alloy and integrally including a cylindrical fitting section. The fitting section includes a partition wall inside, through which a terminal module ("external connector" in the document) is inserted. JP2018-98069A discloses, in particular, screwing the terminal module into a screw hole in the partition wall to be fastened.

JP2019-53943A discloses a terminal module ("connector body" in the document) connectable with a coaxial cable. The terminal module includes a contact at the center, a cylindrical shell, and an insulator between the contact and the shell. The document also discloses a connector case ("rear case" in the document) including a connector insertion section having a connection rib at its inner circumference.

The shell and the rear case are each made of an electrically conductive metal. The shell includes a connection flange. Pressing the connection flange to fit it with the connection rib causes the flange and the rib to press each other in an electrically conductive manner due to plastic deformation.

SUMMARY

A connector module needs to function not only to connect a communication cable such as a coaxial cable with a connection target such as a camera module, but also to block external electromagnetic waves. A connector module may, for this reason, include a shield element inside the connector case as disclosed in JP2021-166161A. However, a connector module including a shield case inside the connector case as in JP2021-166161A not only includes a large number of parts, but also may have a complicated structure as a result of the need to cause the shield case to be electrically conductive to the cylindrical shell.

JP2021-166161A discloses the connector case and also discloses a housing with a first cylindrical portion. The connector case holds the terminal module. This configuration may disadvantageously involve a large number of assembly steps and require use of strong parts to firmly attach the terminal module to the connector case.

JP2018-107097A and JP2018-98069A each disclose, to overcome the above disadvantage, a case section made of aluminum and fitting or screwing a terminal module in the case section to be fixed. This configuration involves a smaller number of production steps and parts, as compared to JP2021-166161A. The configuration of JP2018-107097A will, however, require higher processing accuracy for higher fitting accuracy. The configuration of JP2018-98069A, which requires rotation during assembly, will require a longer cycle time or use of a dedicated jig.

The configuration of JP2019-53943A, to overcome the above disadvantage, requires pressing the connection flange against the connection rib, meaning that this configuration will require use of a dedicated tool to hold the connection flange and the connection rib in contact with each other and press the connection flange and the connection rib together to deform at least one of the connection flange and the connection rib for tight contact.

The techniques disclosed in the above four documents may allow production of a connector module with necessary capabilities, but require time and effort in the processing and production.

The above circumstances have led to a demand for a connector module capable of being assembled easily and blocking electromagnetic waves.

A connector module as an embodiment of this disclosure includes: a connector unit connectable with an end of a communication cable; and a case holding the connector unit, the connector unit including: a shaft-shaped terminal made of an electrically conductive material; a cylindrical shell made of an electrically conductive material and coaxial with the shaft-shaped terminal; and a holder made of an electrically insulative resin material and disposed around the shaft-shaped terminal, the case being made of an electrically conductive material, including a wall with an insertion hole, and holding the connector unit through the insertion hole, the shell including a plurality of radially outward protrusions at an outer surface of a portion disposed through the insertion hole, the protrusions being press-fitted through the insertion hole and in contact with the inner surface of the wall for electric connection between the shell to the case.

The above embodiment is configured as follows: Press-fitting the connector unit through the insertion hole in the case causes the protrusions at the outer surface of the shell to be pressed against that inner surface of the case which defines the insertion hole. This not only electrically connects the shell to the case for a shielding effect, but also keeps the connector unit firmly coupled with the case. Further, the connector unit is press-fittable in a relatively large space. This eliminates the need for a dedicated tool or a long cycle time during production. The connector module is thereby capable of being assembled easily and blocking electromagnetic waves. This configuration also allows effective heat conduction between the case and the shell and effective heat dissipation over an increased heat dissipation area.

The connector module may further be configured such that the shell further includes: a cylindrical shell body; and a flange disposed on a side of the protrusions which side is opposite to the shell body and protruding radially outward, and the shell is die-casted so that the shell body, the protrusions, and the flange are integral with one another.

The above configuration prevents material waste even if the flange has a large diameter, and allows the shell body, the protrusions, and the flange to be integral with one another as compared to a case of, for example, producing a shell by processing a metal material on a lathe.

The connector module may further include: a housing including a cylindrical case surrounding a leading end of the connector unit which leading end protrudes from the wall, wherein the wall has a plurality of through holes around the insertion hole, the housing further includes a plurality of bridges coupling the cylindrical case and disposed inside the respective through holes, and the housing is molded from resin to be integral with the cylindrical case and the plurality of bridges.

The above configuration includes (i) a cylindrical case made of resin and disposed on an outer surface of the wall of the case and (ii) bridges inside the respective through holes in the case for coupling the cylindrical case with restrictors. This allows the case to hold the housing in such a manner as to prevent detachment of the housing from the case, and also prevents rotation of the housing as a whole.

The connector module may further be configured such that the holder is insert-molded with the shaft-shaped terminal as an insert.

The above configuration allows resin to be between the outer surface of the shaft and the inner surface of the shell. This allows the shaft and the shell to be electrically insulated from each other, and also allows the shaft and the shell to be integral with each other. Further, positioning the shaft in a mold during resin injection improves the accuracy of position of the shaft.

DESCRIPTION OF EMBODIMENTS

The description below deals with an embodiment of this disclosure with reference to drawings.

[Basic Configuration]

Figure 1:
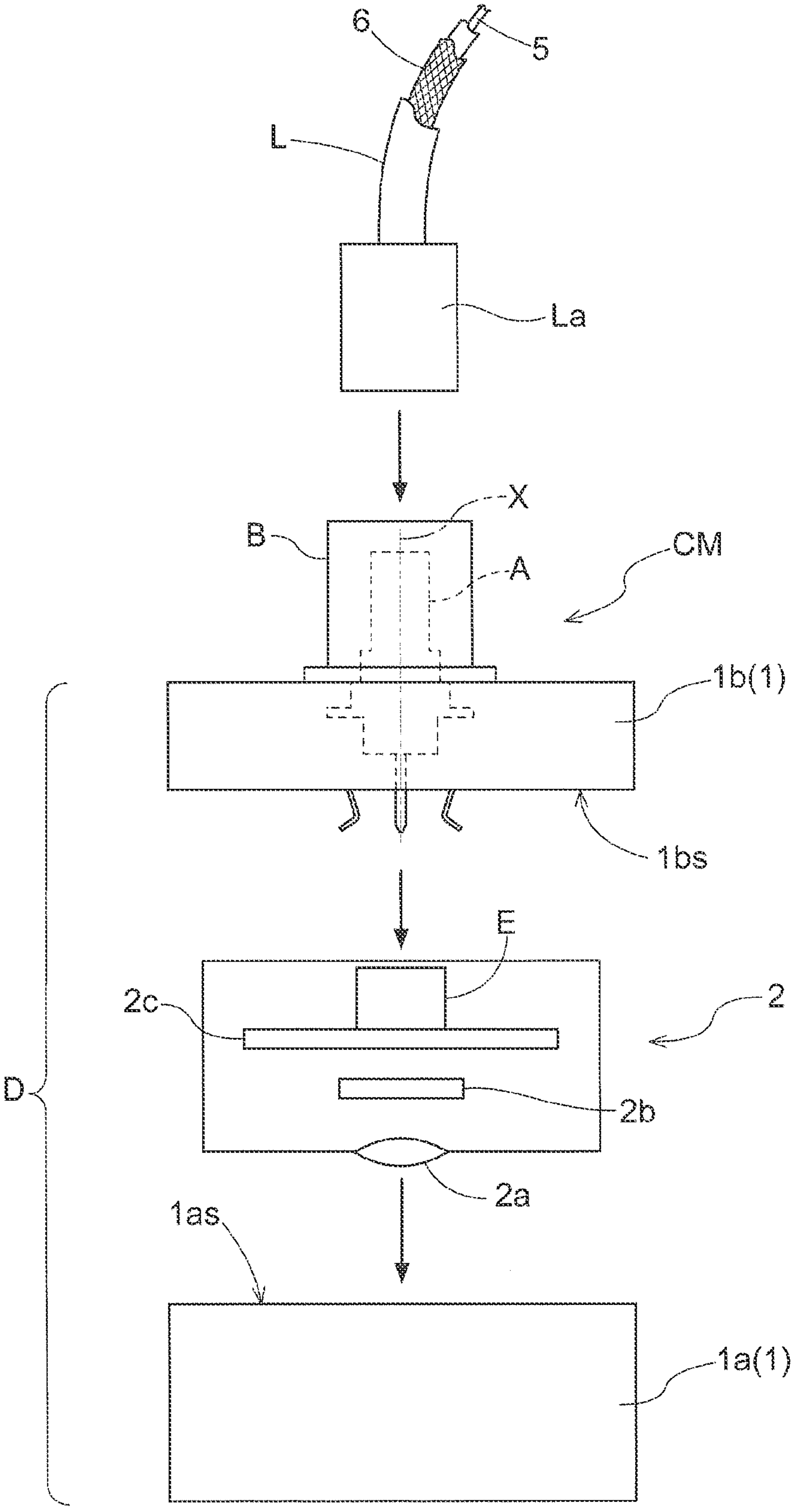
FIG. 1 is a schematic view of a camera unit and a connector module.

FIG. 1 illustrates a connector module CM including a rear case 1*b* (which is an example of the "case") as a portion of a camera casing 1, a connector unit A, and a housing B.

The connector module CM is electrically connectable to a coaxial cable L (which is an example of the "communication cable") through which to transmit information on images captured by a camera unit D mounted in an automobile or the like (vehicle-mounted camera). The present embodiment is configured such that the information on captured images transmitted through the coaxial cable L is displayed on a monitor (not illustrated in the drawings) or stored in a storage (not illustrated in the drawings). The information on captured images is not only simply displayed on the monitor, but also fed back for image analysis for driving assistance, processed as necessary by the electronic control unit (ECU) before being displayed on the monitor, or used to assist parking.

As illustrated in FIG. 1, the camera unit D includes a camera casing 1 and a camera module 2 in the camera casing 1. The camera module 2 includes an imaging lens 2*a*, an imaging element 2*b*, and a substrate 2*c*. The imaging element 2*b* serves to form an image with use of light from the imaging lens 2*a*. The substrate 2*c* provides the function of converting the image into a predetermined format (including a video) and outputting the image as converted. The substrate 2*c* is provided with a receptacle E.

Figure 4:
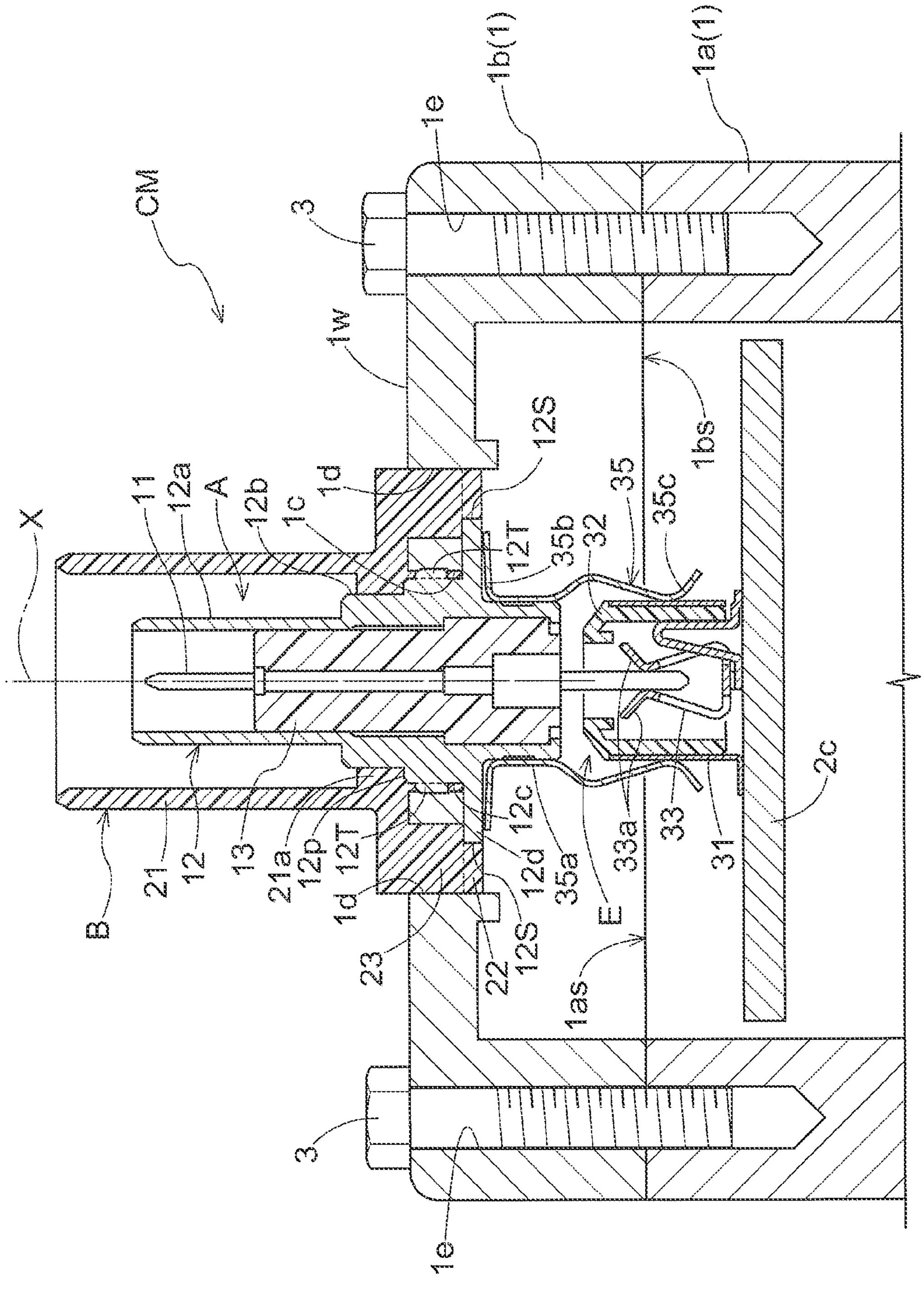
FIG. 4 is a cross-sectional view of a connector unit and a receptacle with a front case and a rear case coupled with each other.

The camera casing 1 is in the form of a box dividable into a front case 1*a* configured to house the camera module 2 and a rear case 1*b* provided with the connector unit A. The front case 1*a* has an opening 1*as*, whereas the rear case 1*b* has an opening 1*bs*. Coupling the front case 1*a* with the rear case 1*b* in such a manner as to join the opening las with the opening 1*bs* connects the connector unit A with the receptacle E on the substrate 2*c* of the camera module 2 as illustrated in FIG. 4. This connection will be described later in detail. The connection allows information on captured images from the camera unit D to be transmitted through the coaxial cable L.

The front case 1*a* and the rear case 1*b* are each produced through die casting or cold forging of aluminum. Joining the opening 1*as* with the opening 1*bs* provides a hermetically sealed camera casing 1.

As illustrated in FIGS. 1 to 4, the connector unit A includes a shaft-shaped terminal 11 and a shell 12; the housing B includes a cylindrical case 21; and the coaxial cable L includes a center conductor 5, an outer conductor 6, and a terminal connector La. Inserting the terminal connector La into the cylindrical case 21 electrically connects the center conductor 5 to the shaft-shaped terminal 11 and causes electric conduction between the outer conductor 6 and the shell 12.

The terminal connector La is a jack connector. The connector module CM may include a lock mechanism configured to prevent detachment of the terminal connector La from the cylindrical case 21.

[Connector Unit]

Figure 2:
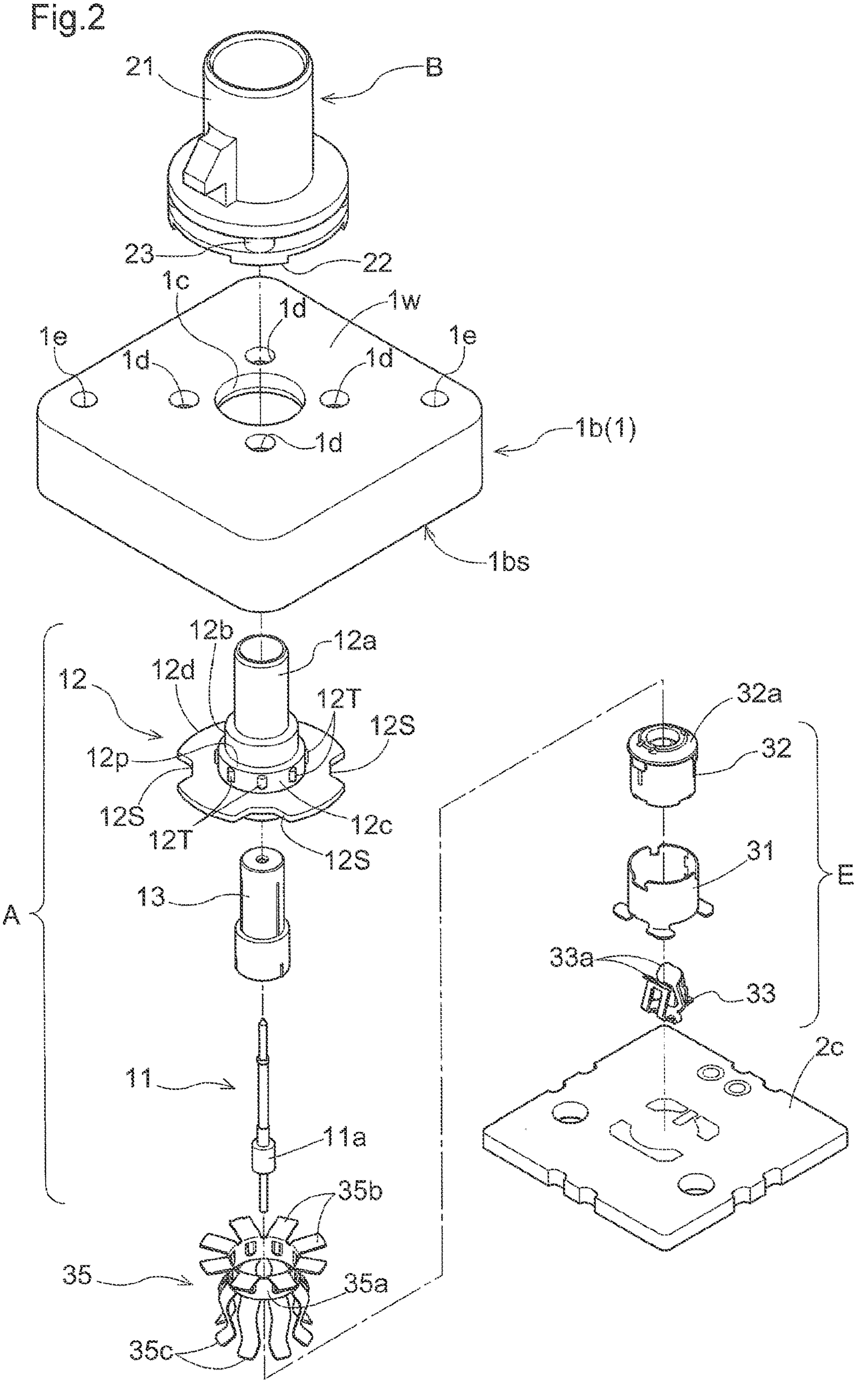
FIG. 2 is an exploded perspective view of a connector unit and a receptacle.
Figure 3:
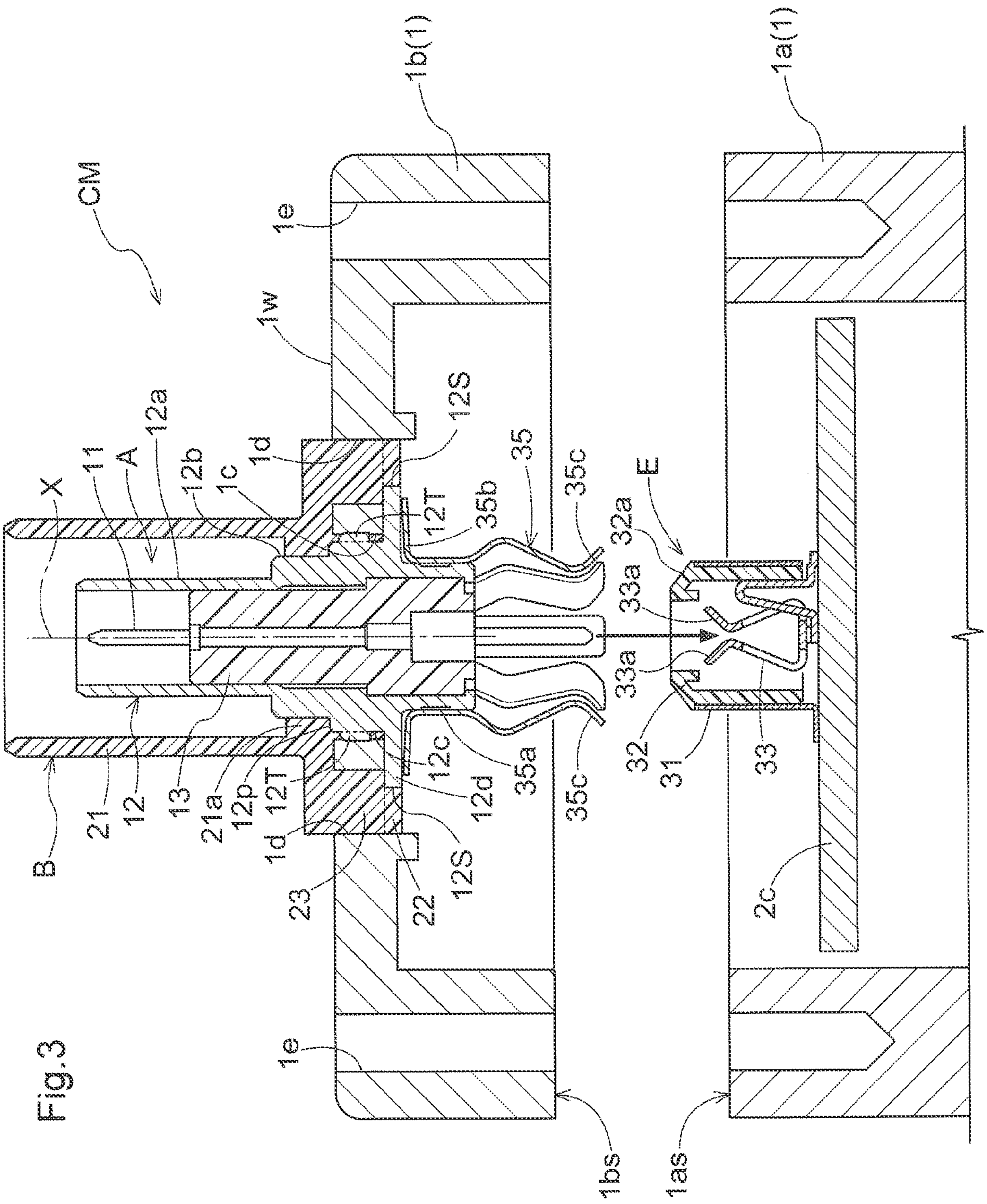
FIG. 3 is a cross-sectional view of a connector unit and a receptacle with a front case and a rear case detached from each other.

As illustrated in FIGS. 2 to 4, the connector unit A includes a shaft-shaped terminal 11, a cylindrical shell 12, and a holder 13. The shaft-shaped terminal 11 is die-casted from an electrically conductive metal material such as zinc. The shell 12 is made of an electrically conductive metal material and coaxial with the shaft-shaped terminal 11. The holder 13 is made of an electrically insulative resin material and disposed in a space defined by the outer surface of the shaft-shaped terminal 11 and the inner surface of the shell 12.

The holder 13 is integrated with the shaft-shaped terminal 11 by insert molding and press-fitted into the shell 12, which is then rotated for a bottom portion thereof to be caulked (high-spin caulking) to prevent detachment of the holder 13. This produces a connector unit A, with the shaft-shaped terminal 11, the shell 12, and the holder 13 integral with one another. The shaft-shaped terminal 11 includes a large-diameter portion 11*a* for impedance matching of the connector unit A.

As illustrated in FIG. 4, the shaft-shaped terminal 11 has a central axis X, and the shell 12 has a central axis coincident with the central axis X.

As illustrated in FIGS. 2 and 3, the rear case 1*b* includes a wall 1*w* opposite to the opening 1*bs* and having an insertion hole 1*c* at the center of the wall 1*w*. Inserting (press-fitting) the connector unit A through the insertion hole 1*c* from the side of the opening 1*bs* allows the rear case 1*b* to hold the connector unit A. In this state, the connector unit A has a leading end protruding from the outer face of the wall 1*w*, and the central axis X of the connector unit A coincides with the center of the insertion hole 1*c*.

The wall 1*w* of the rear case 1*b* has two or more (four for the present embodiment) through holes 1*d* around the insertion hole 1*c* and apart from the central axis X by an equal distance in a direction radially outward of the insertion hole 1*c*. The rear case 1*b* also has through holes 1*e* configured to receive coupling screws 3 (see FIG. 4) to be coupled with the front case 1*a*.

The connector unit A extends from inside the rear case 1*b* to outside the rear case 1*b*. The description below may use the term "leading-end side" to refer to the side on which the connector unit A is exposed from the wall 1*w* and the term "base-end side" to refer to the side opposite to the leading-end side.

The shell 12 is die-casted from an electrically conductive metal material such as zinc. The shell 12 includes, as integral with one another, (i) a cylindrical shell body 12*a*, (ii) a first large-diameter portion 12*b* around a portion of the shell body 12*a* which portion is on the base-end side of the shell body 12*a*, (iii) a second large-diameter portion 12*c* adjacent to the first large-diameter portion 12*b*, and (iv) a flange 12*d* on the base-end side of the second large-diameter portion 12*c*. The flange 12*d* is in the form of a plate extending radially from the central axis X. The flange 12*d* has two or more notches 12S at its edge as illustrated in FIG. 2. The shell 12 includes a step portion disposed at the boundary between the first and second large-diameter portions 12*b* and 12*c* and having a step surface 12*p* orthogonal to the central axis X.

The second large-diameter portion 12*c* has an outer surface provided with two or more protrusions 12T configured to be pressed against that inner surface of the insertion hole 1*c* which is defined by the rear case 1*b*. The protrusions 12T protrude radially outward of the shell 12. The protrusions 12T are each in the shape of a bullet (see FIG. 5) that extends along the central axis X, that is tapered at the leading end in the direction in which the shell 12 is inserted (that is, upward in FIGS. 2 to 4), and that has a trailing end with a surface orthogonal to the central axis X.

Figure 5:
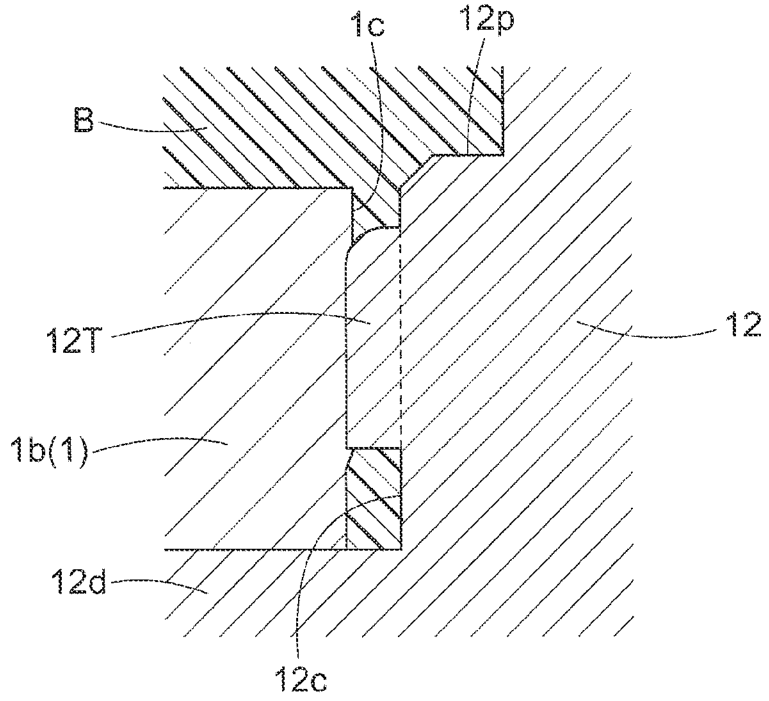
FIG. 5 is a cross-sectional view of a protrusion as pressed against the inner surface that defines an insertion hole.

The bullet-shaped protrusions 12T facilitate press-fitting the connector unit A (specifically, the shell 12) through the insertion hole 1*c*. As illustrated in FIG. 5, the protrusions 12T are pressed strongly against that inner surface of the insertion hole 1*c* which is defined by the rear case 1*b*. This allows the connector unit A to be fixed to the rear case 1*b* reliably and firmly, and prevents the connector unit A from rotating about the central axis X relative to the rear case 1*b*.

The strong press causes electric conduction between the rear case 1*b* and the shell 12 for a shielding effect to reduce the influence of noise, and also allows effective heat conduction between the rear case 1*b* and the connector unit A and effective heat dissipation over an increased heat dissipation area.

With the connector unit A held by the rear case 1*b* as illustrated in FIG. 3, the shell body 12*a* and the first large-diameter portion 12*b* protrude from the insertion hole 1*c* (upward in FIG. 4), whereas the protrusions 12T are pressed against the inner surface that defines the insertion hole 1*c*.

[Housing]

The housing B is molded from resin to be integral with the rear case 1*b*, and then receives the connector unit A as press-fitted inside.

The housing B molded as above includes a cylindrical case 21. The cylindrical case 21 is, as illustrated in FIGS. 3 and 4, disposed on the outer face of the wall 1*w* of the rear case 1*b* and around the shell 12 of the connector unit A. The cylindrical case 21 has a center on the central axis X. The housing B also includes restrictors 22 disposed on the inner surface of the wall 1*w* and extending outward from the flange 12*d*. The restrictors 22 are at the respective positions of gates through which to inject resin in molding the housing B integrally with the rear case 1*b*. The notches 12S in the flange 12*d* are positioned in such a manner as to coincide with the respective gates. The housing B also includes bridges 23. The gates serve as flow paths for resin to flow into the bridges 23. The restrictors 22 and the flange 12*d* thus each have a predetermined thickness. The bridges 23 are disposed inside the respective through holes 1*d* in such a manner as to couple the cylindrical case 21 with the restrictors 22.

As illustrated in FIGS. 3 and 4, the cylindrical case 21 integrally includes a plate 21*a* extending along the outer face of the rear case 1*b*. The plate 21*a* includes, at the inner surface of the cylindrical case 21, a portion that covers the step surface 12*p* at the boundary between the first and second large-diameter portions 12*b* and 12*c*.

[Receptacle]

As illustrated in FIGS. 2 and 3, the receptacle E includes a cylindrical contact 31, a contact case 32, and a press-fit contact 33. The cylindrical contact 31 is made of an electrically conductive metal material (for example, a copper alloy), and is supported by the substrate 2*c*. The contact case 32 is made of an electrically insulative resin, and is fitted in the cylindrical contact 31. The press-fit contact 33 is made of an electrically conductive metal material (for example, a copper alloy), supported by the substrate 2*c*, and disposed inside the contact case 32.

The cylindrical contact 31 is soldered and electrically conductive to ground lines of a printed circuit on the substrate 2*c*. The contact case 32 has a guide surface 32*a* disposed along the circumference and facing away from the substrate 2*c* (that is, facing the side of the connector unit A). The guide surface 32*a* is inclined relative to the central axis X.

The press-fit contact 33 includes a pair of press-fit pieces 33*a* so close to each other as to sandwich a portion of the shaft-shaped terminal 11 which portion is on the base-end side. The press-fit pieces 33*a* are soldered and electrically conductive to signal lines of the printed circuit on the substrate 2*c*. The press-fit pieces 33*a* are elastic. Bringing the rear case 1*b* close to the receptacle E brings the press-fit pieces 33*a* into contact with a base-end portion of the shaft-shaped terminal 11 in such a manner as to sandwich the base-end portion. This causes the press-fit pieces 33*a* to be electrically conductive to the shaft-shaped terminal 11.

As illustrated in FIGS. 2 and 3, the connector unit A includes a connector 35 for the shell 12 to be electrically conductive to the cylindrical contact 31. The connector 35 includes a ring 35*a*, two or more first contact pieces 35*b*, and two or more second contact pieces 35*c*. The ring 35*a* is fixedly fitted around a portion of the shell 12 which portion is on the base-end side. The first contact pieces 35*b* extend from the ring 35*a* toward the outer circumference of the flange 12*d*. The second contact pieces 35*c* extend from the ring 35*a* toward the outer surface of the cylindrical contact 31.

The ring 35*a* and the first and second contact pieces 35*b* and 35*c* are made of an electrically conductive metal material (for example, a copper alloy), and are integral with one another in such a manner as to be electrically conductive to one another. The first contact pieces 35*b* are so elastic as to remain in contact with that face of the flange 12*d* which is opposite to the wall 1*w*. The first contact pieces 35*b* extend radially with the central axis X at the center as viewed along the central axis X (see FIG. 2).

The second contact pieces 35*c* have respective first ends held by the ring 35*a*. The second contact pieces 35*c* are so elastic as to press the outer surface of the cylindrical contact 31 from outside. Bringing the rear case 1*b* close to the receptacle E causes the second contact pieces 35*c* to sequentially (i) come into contact with the guide surface 32*a*, (ii) flexibly deform in such a direction that the respective second ends of the second contact pieces 35*c* move away from the central axis X, and (iii) come into contact with the cylindrical contact 31 due to the elasticity.

[Setup]

The connector module CM is, as described above, configured such that as illustrated in FIG. 4, the opening las in the front case 1*a* and the opening 1*bs* in the rear case 1*b* are brought into close contact with each other and that the front and rear cases 1*a* and 1*b* are fixed to each other with use of coupling screws 3. This operation involves bringing the front and rear cases 1*a* and 1*b* closer to each other. This causes the shaft-shaped terminal 11 to be sandwiched between the press-fit pieces 33*a*, which results in contact and electric conduction between the shaft-shaped terminal 11 and the press-fit contact 33. The signal lines on the substrate 2*c* are thereby conductive to the shaft-shaped terminal 11.

The above operation also brings the second contact pieces 35*c* into contact with the outer surface of the cylindrical contact 31. This causes electric conduction between the ground of the substrate 2*c* and the shell 12.

The connector module CM is configured such that inserting the terminal connector La of the coaxial cable L into the cylindrical case 21 causes electric conduction between the center conductor 5 and the shaft-shaped terminal 11 and also causes electric conduction between the outer conductor 6 and the shell 12 (see FIG. 1).

The signal lines on the substrate 2*c* are thereby conductive to the center conductor 5 and the ground of the substrate 2*c* to the outer conductor 6. This allows information on captured images to be transmitted from the camera unit D through the coaxial cable L.

Advantages of Embodiment

The connector module CM is configured as follows: The holder 13 is made of resin and integral with the shaft-shaped terminal 11. The holder 13 is press-fitted into the shell 12, which is then rotated for a bottom portion thereof to be caulked (high-spin caulking) to prevent detachment of the holder 13. This allows the shaft-shaped terminal 11, the shell 12, and the holder 13 to integrally provide a connector unit A. Press-fitting the connector unit A through the insertion hole 1*c* in the wall 1*w* of the rear case 1*b* to be fixed allows the shell 12 and the rear case 1*b* to be fixed in position relative to each other.

The shell 12 has an outer surface provided with two or more protrusions 12T. The protrusions 12T protrude radially outward of the shell 12. The protrusions 12T are each in the shape of a bullet that extends along the central axis X, that is tapered at the leading end in the direction in which the shell 12 is inserted, and that has a trailing end with a surface orthogonal to the central axis X. This facilitates press-fitting the connector unit A through the insertion hole 1*c*, and reliably fixes the connector unit A to the rear case 1*b*. In particular, the protrusions 12T are pressed strongly against that inner surface of the insertion hole 1*c* which is defined by the rear case 1*b*. This not only allows the connector unit A and the rear case 1*b* to be fixed in position relative to each other, but also causes electric conduction between the rear case 1*b* and the shell 12 for a shielding effect to reduce the influence of noise. This configuration also allows effective heat conduction between the shell 12 and the rear case 1*b* and effective heat dissipation.

The shell 12 is die-casted to integrally include a shell body 12*a*, a first large-diameter portion 12*b*, a second large-diameter portion 12*c*, two or more protrusions 12T on the outer surface of the second large-diameter portion 12*c*, and a flange 12*d*. This reduces material waste as compared to a case of, for example, producing a shell by processing a metal material on a lathe.

The housing B is made of an electrically insulative resin, and includes a cylindrical case 21 and bridges 23. The cylindrical case 21 is on the outer face of the wall 1*w*. The bridges 23 are disposed inside the respective through holes 1*d*. This allows the cylindrical case 21 to be reliably fixed to the rear case 1*b*.

The substrate 2*c* is provided with a receptacle E including members such as a cylindrical contact 31 and a press-fit contact 33 each having a center on the central axis X. With this configuration, coupling the front case 1*a* of the camera unit D with the rear case 1*b* in such a manner that the respective openings 1*as* and 1*bs* are in close contact with each other allows the connector unit A to be electrically conductive to a predetermined circuit on the substrate 2*c*, and thereby allows information on captured images from the camera unit D to be transmitted through the coaxial cable L.

Alternative Embodiments

This disclosure may be configured as below in addition to the embodiments described above. Any element described below that functions as described for the embodiments above is assigned with the same reference numeral as that for embodiments above.

(a) The protrusions 12T are each not necessarily in the shape of a bullet, and may alternatively be each in the shape of a bar oriented along the central axis X or an arc oriented along the circumference of the second large-diameter portion 12*c*. The protrusions 12T may further alternatively be each in the form of a roughened outer surface of the second large-diameter portion 12*c*.

(b) The protrusions 12T may be at any position corresponding to the insertion hole 1*c* in the rear case 1*b*. For instance, the shell 12 may include a straight shell body 12*a*, a flange 12*d* at an end of the shell body 12*a*, and two or more protrusions 12T on the outer surface of the shell body 12*a*.

(c) The connector module CM may serve to connect a communication cable with a device other than a camera.

The arrangements disclosed for the above embodiments (including the alternative embodiments) may each be combined with an arrangement disclosed for another embodiment, as long as such a combination does not cause a contradiction. Further, the embodiments disclosed in the present specification are mere examples. The present disclosure is not limited to those embodiments, and may be altered as appropriate, as long as such an alteration does not result in a failure to attain an object of the present disclosure.

The invention claimed is:

1. A connector module, comprising:

a connector unit connectable with an end of a communication cable; and a case holding the connector unit, the connector unit including:

a shaft-shaped terminal made of an electrically conductive material;

a cylindrical shell made of an electrically conductive material and coaxial with the shaft-shaped terminal; and a holder made of an electrically insulative resin material and disposed around the shaft-shaped terminal, the case being made of an electrically conductive material, including a wall with an insertion hole, and holding the connector unit through the insertion hole, the shell including a plurality of radially outward protrusions at an outer surface of a portion disposed through the insertion hole, the protrusions being press-fitted through the insertion hole and in contact with the inner surface of the wall for electric connection between the shell to the case.

2. The connector module according to claim 1, wherein the shell further includes:

a cylindrical shell body; and a flange disposed on a side of the protrusions which side is opposite to the shell body and protruding radially outward, and the shell is die-casted so that the shell body, the protrusions, and the flange are integral with one another.

3. The connector module according to claim 2, further comprising:

a housing including a cylindrical case surrounding a leading end of the connector unit which leading end protrudes from the wall, wherein the wall has a plurality of through holes around the insertion hole, the housing further includes a plurality of bridges coupling the cylindrical case and disposed inside the respective through holes, and the housing is molded from resin to be integral with the cylindrical case and the plurality of bridges.

4. The connector module according to claim 3, wherein the holder is insert-molded with the shaft-shaped terminal as an insert.

5. The connector module according to claim 2, wherein the holder is insert-molded with the shaft-shaped terminal as an insert.

6. The connector module according to claim 1, further comprising:

a housing including a cylindrical case surrounding a leading end of the connector unit which leading end protrudes from the wall, wherein the wall has a plurality of through holes around the insertion hole, the housing further includes a plurality of bridges coupling the cylindrical case and disposed inside the respective through holes, and the housing is molded from resin to be integral with the cylindrical case and the plurality of bridges.

7. The connector module according to claim 6, wherein the holder is insert-molded with the shaft-shaped terminal as an insert.

8. The connector module according to claim 1, wherein the holder is insert-molded with the shaft-shaped terminal as an insert.

* * * * *